Figure 1:
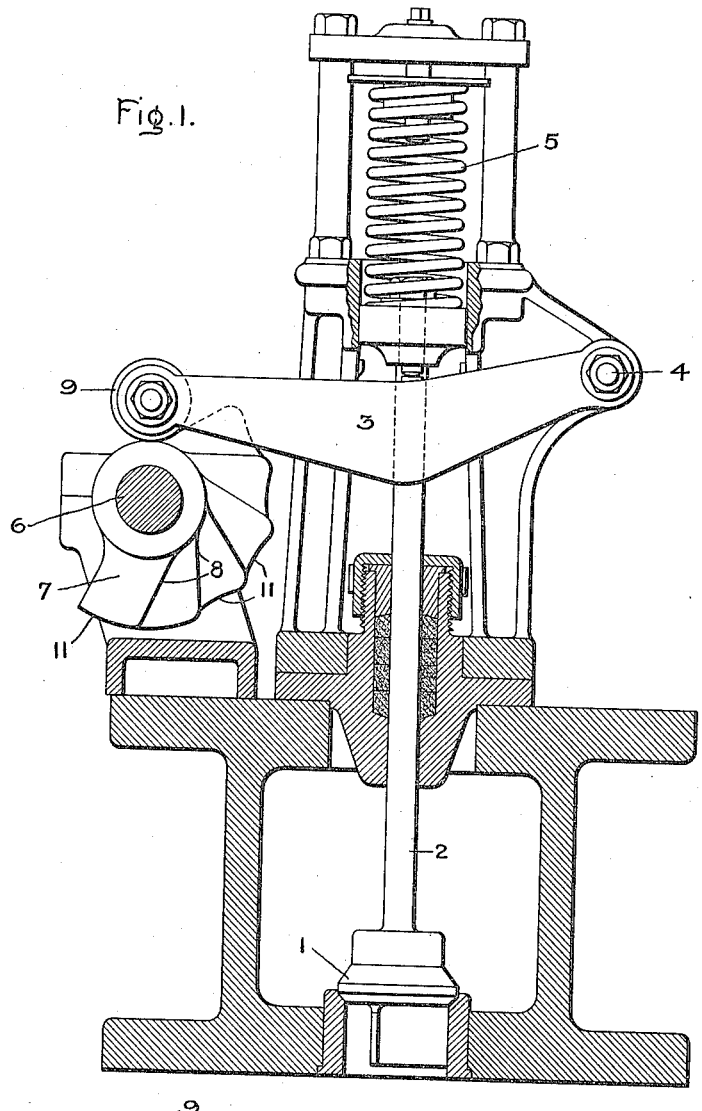

O. JUNGGREN.
VALVE OPERATING MECHANISM.
APPLICATION FILED JULY 16, 1914.

1,157,941.

Patented Oct. 26, 1915.

Witnesses:
Margaret E. Stooley
Helen Orford

Inventor:
Oscar Junggren,
by Albert G. Davis
His Attorney.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

VALVE-OPERATING MECHANISM.

1,157,941.  Specification of Letters Patent.  Patented Oct. 26, 1915.

Application filed July 16, 1914.   Serial No. 851,301.

*To all whom it may concern:*

Be it known that I, OSCAR JUNGGREN, a citizen of the United States, residing at Schenectady, county of Schenectady, State of New York, have invented certain new and useful Improvements in Valve-Operating Mechanisms, of which the following is a specification.

This invention relates to elastic fluid turbines, and its object is to provide an improved valve operating mechanism which will meet some of the defects in operation that have developed in connection with existing installations. When a steam turbine is operated continuously for a long time, as is frequently the case, the nozzle valves and the emergency stop valve and their stems are liable to become coated with mud and other impurities which tend to prevent prompt and complete seating of said valves in case of necessity. This is a dangerous condition of things because with a condensing turbine it requires only a small amount of steam to cause the machine to run away when the load is removed, as for instance by the opening of the circuit breakers in the main leads. At such times it is absolutely essential that the valves shall close quickly and tightly, so that not a pound of steam can reach the turbine. My invention aims to insure this result even when the turbine has been running for a long time without any occasion to close the emergency valve or even to shut all of the nozzle valves. The means which I employ is not subjected to the action of the steam so that it is free from the deteriorating effects thereof. Moreover, it is of such a nature that it is continuously in operation, and therefore maintains the valves always in good operative condition. I accomplish this result so far as the nozzle valves are concerned, by keeping the valves moving slightly, preferably by giving the cams which open and close them an irregular or wavy periphery instead of a smooth cylindrical surface. The cam shaft in the usual hydraulic valve gear of a turbine is never quiet for any length of time, because the variations in load and steam pressure cause the governor to oscillate the shaft almost constantly. By making the cams with a wavy periphery, they are able to give the valves a more or less constant slight vibration up and down—not enough to affect appreciably the flow of steam, or produce a pulsating action thereof, but yet sufficient to prevent the valve stems from sticking or getting befouled to an extent which would interfere with the quick and complete seating of the valve. This same expedient can be readily applied to the emergency stop valve, to keep it in condition to close tightly when tripped.

Figure 2:
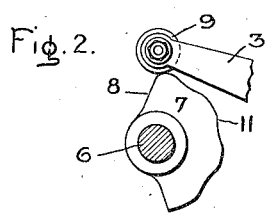
Figure 3:
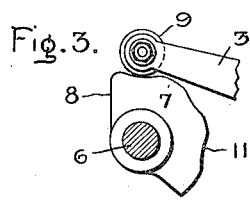

In the accompanying drawing, Figure 1 is a vertical sectional elevation of a nozzle valve and its operating mechanism, embodying my invention. Figs. 2 and 3 show portions of a valve-lifting lever and its cam.

The nozzle valve 1 has a stem 2 which is engaged by a lifting lever 3 fulcrumed at 4, said stem passing through a stuffing box. A strong spring 5 acts to seat the valve when the lever is lowered. The shaft 6 carries a cam 7 which has an active face 8 adapted to engage a friction roller 9 at the free end of the lever 3 and thereby lift the valve 1 when the shaft is turned by the governor. The shaft carries a plurality of these cams, spaced apart to operate respectively on a plurality of valve levers and having their active faces angularly displaced along the shaft to cause them to operate in succession. Each cam has a normally cylindrical periphery which serves to hold its valve open so long as the load requires it.

The above mentioned construction is that which is in common use today.

My improvement consists in making the otherwise cylindrical peripheries or holding faces 11 of the cams slightly irregular or wavy, as shown in the drawings, so that as the cam shaft oscillates back and forth incessantly, the open valves will be given a slight tremulous movement up and down. A play of about three thirty-seconds of an inch is ample to keep the valve stems cleared of impurities and sediment, so that when the cams are suddenly withdrawn by the governor, the springs 5 will have an opportunity to act upon stems that are entirely free to move.

By referring to Fig. 1 it will be observed that the last cams have the customary cylindrical holding faces and that the irregular faces are provided only for the preceding cams. This is done because the turbine at normal load does not run with the last few valves open, and therefore there is little liability of their sticking.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination with a valve, of a cam for moving it, said cam being provided with a surface of irregular contour to give slight vibrations to the valve.

2. The combination with a valve for regulating the flow of elastic fluid to a turbine, of a cam having a lifting face and a holding face for regulating the valve, said holding face having a surface of irregular contour to give slight vibrations to the valve.

3. The combination with the valve mechanism of an elastic fluid turbine, comprising lifting levers for the valves, of cams adapted to impart slight vibrations to the levers of those valves which are open.

4. The combination with the valve mechanism of an elastic fluid turbine, comprising lifting levers for the valves, of cams for said levers having their holding faces irregular in order to give slight vibrations to the valve stems when said valves are open.

5. The combination with the valve mechanism of an elastic fluid turbine, comprising lifting levers for the valves, and cams for actuating said levers, of wavy holding faces for all but the last few of said cams.

6. The combination of a valve, a seat therefor, a lever and cam for moving the valve from its closed to full open position, and means moving with the cam for imparting small movements to the valve without substantially changing its position with respect to its seat.

7. The combination of a valve, a seat therefor, a lever and cam for opening the valve, a spring tending to close the valve, and means acting on the valve in its full open position to impart slight movements thereto to prevent its stem from sticking.

In witness whereof, I have hereunto set my hand this 15th day of July, 1914.

OSCAR JUNGGREN.

Witnesses:
E. D. WILLIAMS,
HELEN ORFORD.

Copies of this patent may be obtained for five cents each, by addressing the "Commissioner of Patents, Washington, D. C."